United States Patent

[11] 3,586,940

| [72] | Inventor | Jens Benirschke<br>Klagenfurt, Austria |
|---|---|---|
| [21] | Appl. No. | 833,962 |
| [22] | Filed | June 17, 1969 |
| [45] | Patented | June 22, 1971 |
| [73] | Assignee | Firma Carinthia Elektrogerate Gesellschaft m.b.H.<br>Kalgenfurt, (Karnter), Austria |
| [32] | Priority | June 25, 1968 |
| [33] | | Austria |
| [31] | | A6103/68 |

[54] APPARATUS WITH AN ELECTRICAL DRIVING MOTOR
2 Claims, 5 Drawing Figs.

[52] U.S. Cl. .................................................. 318/225,
307/130, 318/442
[51] Int. Cl. ........................................ H02k 17/30
[50] Field of Search .......................................... 318/225.1,
442, 225; 307/130; 323/68

[56] References Cited
UNITED STATES PATENTS
2,157,417  5/1939  Kneisley .................... 318/225.1
2,619,621  11/1952  Brown ......................... 318/225.1
3,130,328  4/1964  Moore ........................ 318/442

*Primary Examiner*—Oris L. Rader
*Assistant Examiner*—K. L. Crosson
*Attorney*—Watson, Cole, Grindle and Watson ABSTRACT: This invention provides electrically driven apparatus, such as electric razors, electric coffee grinders and the like, in which the electrical drive includes an electromagnetic stator having at least two poles, with a switch which automatically adjusts the exciter winding of the stator to take either one of two different mains voltage ranges according to the mains voltage to which the apparatus is connected. The switch has an actuating member which is pivotally mounted on one of said stator poles and which has a portion lying adjacent another stator pole which, in use, is of opposite polarity so that the member is attracted to it, and a spring which normally holds the member away from the second pole in a position in which the exciter winding is adjusted to take the lower voltage range, but which is overcome by the magnetic attraction of the second pole on the member as soon as, and only for as long as, the apparatus is connected to an electrical source within the higher voltage range, this causing the switch to be actuated to adjust the exciter winding to take the higher voltage range.

PATENTED JUN 22 1971

3,586,940

INVENTOR
Jens Benirschke

BY
Watson, Cole, Grindle & Watson
ATTORNEYS

APPARATUS WITH AN ELECTRICAL DRIVING MOTOR

This invention relates to electrically driven apparatus, such as electric razors, in which the electrical drive has at least two electromagnetically excited stator poles and a switch for adjusting the exciter winding to take either one of two different mains voltage ranges. In apparatus of this kind the switch is usually a simple manually actuated switch. However this involves a risk that the operator can inadvertently connect the apparatus to a mains carrying the higher voltage, without previously switching the exciter winding to take the higher voltage, and this can result in damage to the apparatus.

The aim of the present invention is to prevent such incorrect operation of this type of apparatus and to this end, according to the invention, in an apparatus of the kind described the switch has an actuating member which is pivotally mounted on one of the stator poles and which has a portion lying adjacent another stator pole which, in use, is of opposite polarity so that the member is attracted to it, and a spring which normally holds the member away from the second pole so that the exciter winding is adjusted to take the lower voltage range but which is overcome by the magnetic attraction of the second pole on the member as soon as, and only for as long as, the apparatus is connected to an electrical source within the higher voltage range, this causing the switch to adjust the exciter winding to take the higher voltage range.

What is obtained in this way is that although the apparatus is normally adjusted to take the lower mains voltage range, as soon as it is connected to the higher mains voltage range the actuating member automatically switches the apparatus over to safely take the higher voltage. The operator is therefore relieved of any necessity to switch the apparatus over manually to take the higher voltage. The operator merely connects the apparatus to the mains, without needing to worry about whether the mains voltage is high or low.

The construction in accordance with the invention is particularly simple in the case of an apparatus in which the stator comprises a pack of lamellae and each pole is provided with a screw for holding the lamellae together on a support. In this case the two screws corresponding to the poles with which the actuating member is associated may be extended, and the member pivotally mounted on one of them while the other screw forms a mechanical stop for the member when it is pulled towards the corresponding pole.

Two examples of apparatus in accordance with the present invention are illustrated diagrammatically in the accompanying drawings, in which.

Figure 1:
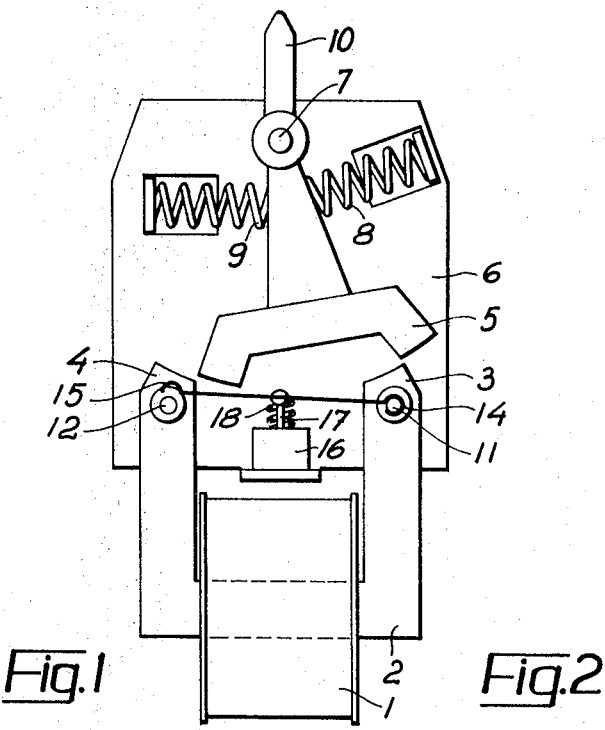
FIG. 1 is a front view of part of a mechanism for driving an electric razor in accordance with the invention.
Figure 2:
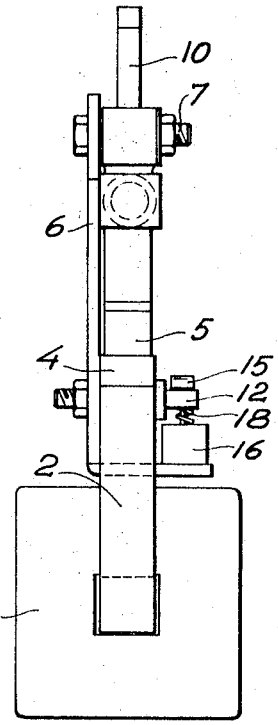
FIG. 2 is a side elevation of the mechanism shown in FIG. 1.

FIGS. 1 and 2 show a swinging armature motor for driving the razor, the motor having a stator 2 in the form of a U-shaped pack of lamellae excited by a coil 1. The free ends of the two arms of the stator 2 form opposite magnetic poles 3 and 4, which cooperate with a swinging armature 5 capable of pivoting, against the influence of springs 8 and 9, about a pivot pin 7 mounted on a nonmagnetic base plate 6. The springs 8 and 9 take support against projections from the base plate 6, and against the swinging armature 5. The drive for the apparatus, in this case for driving the lower cutter of the razor, is delivered by the free end 10 of the swinging armature 5, which oscillates under the influence of the alternating magnetic flux produced by the stator 2. The stator is mounted on the nonmagnetic base plate 6 by means of attachment screws 11 and 12 which pass through drillings in the two magnet poles 3 and 4. The screws 11 and 12 pass through drillings in the base plate and are secured to the base plate by nuts. The attachment screws 11 and 12 at the same time serve to hold the lamellae of the stator together. This entire assembly is installed in the razor.

A switching arm 13 is pivoted at one end to the magnet pole 3 of the stator, the switching arm 13 being made of a magnetizable material. For this purpose the end 14 of the switching arm is bent around to form a sleeve which embraces an extended end on the attachment screw 11. The switching arm 13 is therefore magnetically connected to the magnet pole 3. The switching arm 13 is free to pivot about the end of the screw 11, which acts as a pivot pin. The other end 15 of the switching arm 13 is situated near the attachment screw 12 of the opposite magnet pole 4 of the stator. This screw 12 also has an extension, which serves as a mechanical stop for the switching arm. An electrical switch 16, which controls the exciter winding 1 to take either one of two different mains voltage ranges, is mounted on the base plate 6, and is connected through a link 17 to the switching arm 13. Between the switching arm 13 and the switch 16 there is a compression spring 13 which tends to push the switching arm outwards, so that the free end 15 is held away from the stop 12 on the pole 4. In this position the switch is normally in its position of rest, and the apparatus is adjusted to take the lower mains voltage.

With the switching arm 13 in its position of rest, as described above, although the free end 15 of the switching arm is held clear of the stop 12, it remains sufficiently near to be within the field of influence of the magnetic pole 4. As soon as the apparatus is connected to the higher mains voltage, the attraction of the magnet pole 4 overcomes the bias of the spring 18 and pulls the free end 15 of the switching arm towards the screw 12, actuating the switch 16, through the link 17, and so switching the exciter winding 1 over to take the higher mains voltage. In this movement the switching arm 13 acts as the armature of a relay. When the switching movement has been completed, the magnetic flux of the stator decreases, but is still sufficient to retain the end 15 of the switching arm 13 in contact with the screw 12, to the effect that the apparatus remains adjusted to take the higher voltage.

The electrical contacts of the switch 16, which are not shown in the drawing, are in the electric circuit of the exciter winding 1, as will now be described on the basis of the arrangements shown in FIGS. 3 and 4. These circuits are arranged in such a way that when the switching arm 13 is in its position of rest the circuit for the exciter coil 1 is suitable for operation at the lower mains voltage, for example at 110 volts, whereas when the switching arm 13 is in its active position with its free end 15 resting in contact with the screw 12, the exciter coil circuit is suitable for operation at the higher mains voltage, for example 220 volts. This is obtained as follows. The strength of the spring 18, together with the position of the switching arm 13 when at rest, are chosen so that when the apparatus is connected to the lower voltage source the magnetic pull exerted by the magnet pole 4 on the switching arm 13 is not enough to bring the arm 13 away from its position of rest. The apparatus therefore remains adjusted for operation on the lower mains voltage. On the other hand, as soon as the apparatus is connected to the higher voltage source, the magnetic attraction exerted by the magnet pole 4 on the switching arm 13 becomes high enough to pull the arm 13 towards the screw 12, with the result that the switch 16 is switched over to adjust the winding 1 for operation on the higher mains voltage. As soon as the switching over has been effected, the attraction exerted by the magnet pole 4 on the switching arm 13 decreases, but still remains enough to hold the end 15 of the switching arm in contact with the screw 12. The amount of magnetic flux required to retain the arm in this closed position is less than that required to pull it in from the open position. This effect is well known in the operation of magnetic switches. The switched over state prevails as long as the exciter coil is connected to the higher mains voltage. What is obtained is that the apparatus cannot be operated incorrectly, that is to say it cannot be connected to the higher mains voltage without switching over taking place to cause adjustment to receive the higher voltage, the operator being entirely relieved of the necessity to switch over manually.

Figure 3:
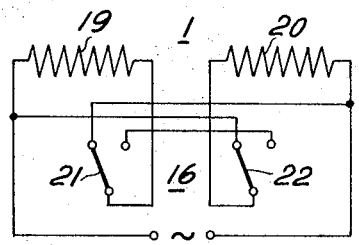
FIGS. 3 and 4 show alternative electric circuits for use in the example shown in FIG. 1 and that shown in FIG. 5.

FIG. 3 shows an electric circuit for switching over the exciter winding 1 of a motor of the kind described above. The exciter winding consists of two parts 19 and 20, both having the same number of turns. The two parts 19 and 20 are shown connected in parallel, by means of the selector contacts 21 and 22 of the switch 16, for operation on the lower mains voltage, whereas when the apparatus is connected to the higher mains voltage range the arm 13 moves to the closed position causing the switch 16 to move the selector contacts 21 and 22 to connect the two parts 19 and 20 of the winding 1 in series. This arrangement is very well suited for switching over between 110 and 220 volt mains, because in this case the higher voltage is exactly twice the lower voltage and consequently the magnetic flux acting on the swinging armature 5 is the same, and the motor power is the same, whichever mains voltage is being used.

Figure 4:
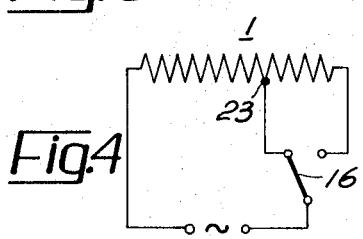

FIG. 4 shows a circuit which can be used in those cases where the two mains voltages do not differ by a factor of exactly two. In this case there is a tap 23 in the exciter coil 1. When the arm 13 is in its rest position, the switch 16 is in the position shown in the figure and the apparatus is adapted to take the lower mains voltage, whereas for the higher mains voltage the switch 16 is switched over so that the entire exciter winding is in use.

Figure 5:
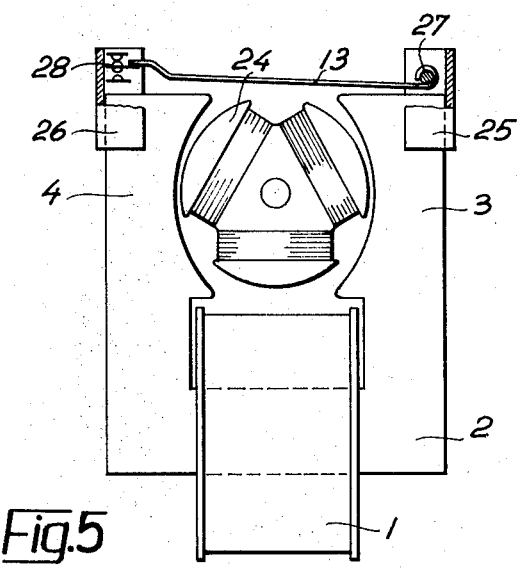
FIG. 5 shows part of the mechanism of a second example in accordance with the invention.

FIG. 5 shows a motor with a rotary armature 24 situated between two opposite magnet poles 3 and 4 of a stator 2, whose exciter coil winding is shown at 1. Motors of this kind are often used for domestic appliances, such as electric coffee mills, mixers and the like. A pressed steel frame 25, 26 of U-shaped cross section fits over the two magnet poles 3 and 4. The part 25 has a pivot pin 27 on which pivots a switching arm 13, which extends across the end of the stator as far as the opposite magnet pole 4. The part 26 contains a switch 16 with a leaf spring middle contact 28. The free end of the switching arm 13 acts on the middle contact 28, which is spring-loaded so that it tends to lift the switching arm 13 into its position of rest.

In its method of functioning the device of FIG. 5 is analogous to the device shown in FIGS. 1 and 2. When the apparatus is connected to the lower voltage source, the magnetic attraction exerted by the magnet pole 4 is not enough to pull the switching arm 13 down. On the other hand as soon as the apparatus is connected to the higher voltage source, the attraction of the magnet pole 4 overcomes the leaf spring bias and pulls the switching arm 13 down, actuating the switch 16 and so switching the exciter winding 1 over to take the higher voltage. After the switching over has taken place the switching arm 13 still remains in the pulled down position, the attraction exerted by the magnet pole 4 still being sufficient for this. The apparatus therefore remains switched over to take the higher voltage, as long as it remains connected to the higher voltage mains. As soon as the apparatus is disconnected from the mains, the poles 3 and 4 of the stator 2 are deenergized and the spring contact 28 lifts the switching arm 13 back again into its position of rest, in which the electric circuit of the exciter coil 1 is adjusted to take the lower voltage.

The apparatus can of course be modified in many ways, compared to the examples described here, without leaving the frame of the invention, particularly in regard to the constructional details of the switching arm 13 and of the switch 16. For example the switching arm 13 can itself be resilient, making it unnecessary to use a separate spring 18. The switch 16 can be a spring-loaded switch, for example of the kind called a microswitch. Furthermore the mounting of the switching arm on one magnet pole in such a way that it cooperates with the other magnet pole of the stator can be varied. The motor itself can of course have several magnet poles, in which case the switching arm can cooperate with any two poles which, in use, are of opposite polarity.

I claim:

1. An apparatus, such as an electric razor, with an electrical driving motor of the kind comprising an electromagnetic stator having at least two poles, and an exciter winding on said stator for energizing said poles, and with a switch having two positions for adjusting said exciter winding to take either one of two different mains voltage ranges, wherein said switch includes an actuating member, means pivotally mounting said actuating member on a first one of said stator poles whereby a free portion of said actuating member lies adjacent a second stator pole which, in operation, is of opposite polarity to said first pole, and spring biasing means which normally holds said free portion of said actuating member away from said second pole in a position defining the first position of said switch, wherein said exciter winding is adjusted to take the lower of said voltage ranges, but which spring biasing means being designed to be overcome by the increased magnetic attraction of said second pole on said free portion of said actuating member as soon as, and only for as long as, said exciter winding is connected to an electrical source within the higher of said voltage ranges, whereby said free portion of said actuating member is shifted towards said second pole in a position defining the second position of said switch, thereby adjusting said exciter winding to take said high voltage range.

2. Apparatus as set forth in claim 1, including a support for said electrical driving motor, and wherein said stator comprises a pack of lamellae, screw means associated with each of said stator poles holding said lamellae together on said support, and first and second extensions on said screw means associated with said first and second poles respectively, said first extension providing means on which said actuating member is pivotally mounted and said second extension forming a mechanical stop for said free portion of said actuating member when said apparatus is connected to said higher voltage range.